No. 869,308. PATENTED OCT. 29, 1907.
W. F. KESSLER.
CHEESE CUTTER.
APPLICATION FILED OCT. 31, 1904.
3 SHEETS—SHEET 1.
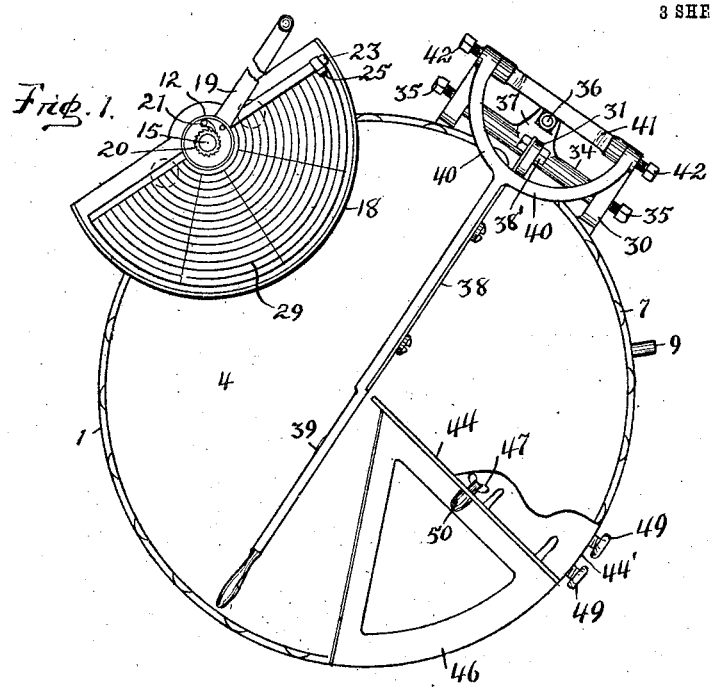
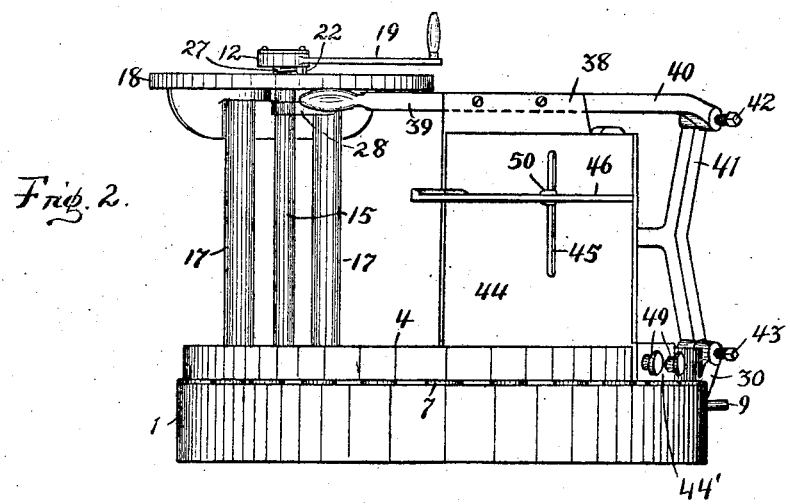
WITNESSES: William F. Kessler INVENTOR
By Chapin & Denny
His ATTORNEYS No. 869,308.  
PATENTED OCT. 29, 1907.  
W. F. KESSLER.  
CHEESE CUTTER.  
APPLICATION FILED OCT. 31, 1904.

3 SHEETS—SHEET 2.

WITNESSES:

William F. Kessler INVENTOR

BY Chapin & Denny

*His* ATTORNEYS

No. 869,308.  
PATENTED OCT. 29, 1907.
W. F. KESSLER.  
CHEESE CUTTER.  
APPLICATION FILED OCT. 31, 1904.
3 SHEETS—SHEET 3.
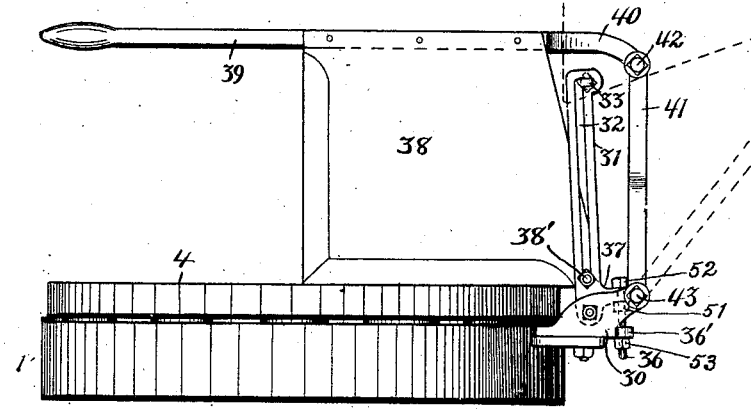
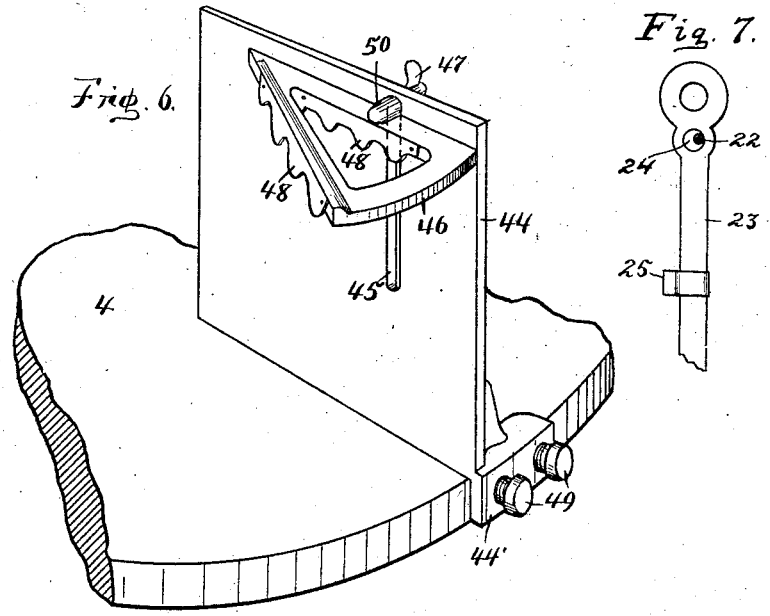
WITNESSES:  
William F. Kessler INVENTOR  
BY Chapin & Denny  
His ATTORNEYS.

UNITED STATES PATENT OFFICE.

WILLIAM F. KESSLER, OF AUBURN, INDIANA.

CHEESE-CUTTER.

No. 869,308.  Specification of Letters Patent.  Patented Oct. 29, 1907.

Application filed October 31, 1904. Serial No. 230,648.

*To all whom it may concern:*

Be it known that I, WILLIAM F. KESSLER, a citizen of the United States, residing at Auburn, in the county of Dekalb, in the State of Indiana, have invented certain new and useful Improvements in Cheese-Cutters; and I do hereby declare that the following is a full, clear, and exact description of the invention, which will enable others skilled in the art to which it appertains to make and use the same, reference being had to the accompanying drawings, which form part of this specification.

My present invention relates to improvements in that type of cheese-cutting appliances in which is provided a gage for determining the predetermined size or value of cuts from the cheese.
The object of my invention is to provide an apparatus of economical construction, efficient and reliable in action, wherewith a cheese of any size or weight within the capacity of the apparatus, may be divided or subdivided into parts of any desired given weight or size, without further attention on the part of the salesman or operator than the preliminary setting of the apparatus in accordance with the total weight of the cheese to be divided or subdivided.

The novel features of my invention reside in the manner of mounting the cheese cutting knife, and the means for imparting to it a draw-cut in cutting through the hard exterior rind as it enters the cheese; the means for temporarily balancing the cheese supporting turn-table as to secure a proper centering of a cheese which has been sagged out of shape by heat or in storage or other cause; the means for measuring any desired aliquot part of the cheese before severing the same; and the means for firmly holding the cheese body in position while cutting a piece therefrom; and also in the means for actuating the cheese carrying turn-table.

Figure 3:
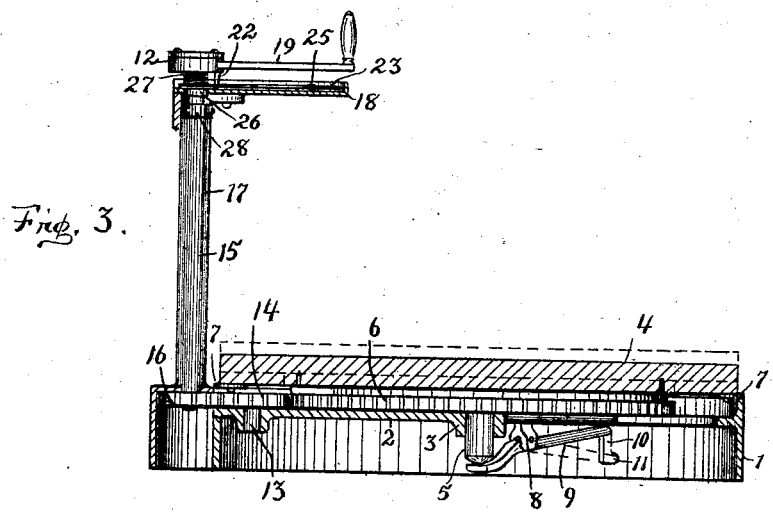
Figure 4:
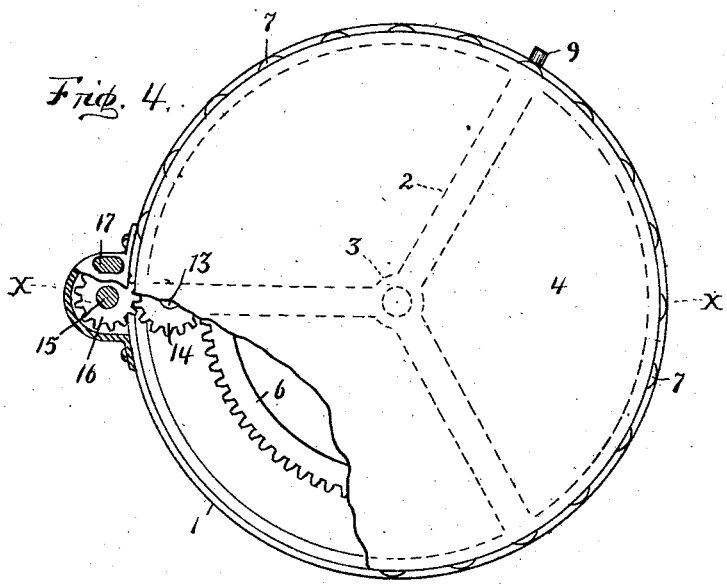

My invention consists of a circular turn-table for supporting the cheese, rotatably mounted upon a suitable base; means for pivotally balancing the said table at its center; means for actuating the said table rotatably;
a radially arranged and pivotally mounted knife whose cutting action is automatically controlled in its descent; means for guiding and directing the knife in its operation; means for rigidly securing the cheese body in position while slicing the pieces therefrom; and an indicating mechanism in coöperative arrangement with the turn-table which enables the operator to cut the exact amount desired from the cheese in accordance with a segmental scale in coöperative arrangement with said mechanism.
Similar reference numerals indicate like parts throughout the several views in which Figure 1 is a plan view of my invention showing the relative arrangement of the operating parts. Fig. 2 is a side elevation of the same. Fig. 3 is a cross section of the same taken on the lines x—x of Fig. 4, showing the means for elevating and actuating the cheese supporting turn-table. Fig. 4 is a plan view of the turn-table partly broken away to show the meshing gears by which it is actuated. Fig. 5 is a side elevation with the feeding and indicating mechanism omitted, and showing the cutting knife in its normal position and shown in its elevated position by dotted outlines. Fig. 6 is an enlarged perspective detail of the attachment for rigidly securing the cheese body while cutting the same. Fig. 7 is a detail of the indicating finger for the segmental scale plate.

In the cylindrical base 1 is arranged a fixed or integral spider 2 having a central hub 3 in which is rotatably mounted the pendent stud 5, to whose upper end is rigidly fixed the large gear 6, to which is secured the turn table 4. To the lower face of the turn table 4 is fixed a series of metal washers 7 at its perimeter, adapted to project over the upper edge of the base 1 for the purpose of normally supporting the turn-table. To the lower face of the spider 2 at or near its center is fixed a pendent bifurcated hanger 8 in which is pivotally mounted a hand-lever 9 whose outer end projects through a slot 10 in the base 1, having an offset 11 in the lower end thereof. The inner end of the lever 9 rests directly beneath the conical lower end of the stud 5, and is adapted to elevate the said stud and its surmounted turn-table, and to support the same in an elevated position, as shown by dotted outline in Fig. 3, when the handle of the lever 9 is secured in the offset 11, for the purpose hereafter described.

A gear wheel 14 is rotatably mounted on the stud 13 which is fixed in the spider 2, and is adapted for a meshing engagement with the gear wheel 6. On the lower end of the operating shaft 15, Fig. 1, is rigidly fixed the gear wheel 16 in mesh with the gear wheel 14, and adapted to actuate the turn-table through the medium of the wheels 14 and 6. On the opposite sides of the shaft 15 and immediately adjacent thereto, are arranged the fixed upright standards 17 on the base 1 having upon their upper ends the fixed scale-plate 18, through which passes the upper end of the rod 15. On the upper end of this rod 15 is pivotally arranged the operating handle 19, having a casing 12 upon its inner end containing a ratchet 20 fixed on the shaft 15, and also containing a pivoted pawl 21 having a holding engagement with the ratchet to prevent the rotation of the handle, with respect to the shaft 15, in more than one direction.

On the upper end of the shaft 15, immediately below the handle 19, is frictionally mounted the indicating arm 23 which is directly above and in coöperative relation with the scale plate 18. Immediately below the inner end of the arm 23 is rigidly fixed on said shaft 15 the collar 26 on the upper face of which the inner end of the indicating arm 23 rests. A coiled spring 27 having a proper tension is mounted on the shaft 15 with its lower end bearing upon the upper face of the arm 23, thus giving it a frictional engagement therewith, whereby this indicator arm will normally move with the shaft 15, and yet has a limited movement independent thereof. This indicating arm 23 has a slidable indicating finger 25 adapted to cooperate with either of the scale lines 29 on the plate 18 for the purpose of determining the size of the slice in ounces or pounds, and in combination with ounces and pounds it will, by indicating marks and figures, also allowing for the fluctuation of prices on cheese, compute five cent and ten cent cuts.

To fully describe my scale, I will make use of 20 concentric semi-circular scales; each scale having ounces and pound marks, and also indicating marks or dots which measure five cent and ten cent cuts at a variation or price on cheese from ten cents to twenty cents per pound, and are spaced as follows: If a cheese sells at 20 cts. per pound, the fourth ounce or a quarter pound would be sold for 5 cts: if 19 cts. per lb. a mark or dot will be found a little further than the fourth ounce from the starting point, thereby necessitating a slight further movement of the indicator. In like manner any desired quantity of cheese can readily be measured either in weight or in money value. I prefer the inner scale for the lightest cheese and will limit same at 25 lbs., therefore, each line towards the outer one will measure a cheese of one lb. greater weight; the outer or twentieth line will then compute a cheese weighing 45 lbs. A greater number of lines can be added if desired and the lightest weight could be placed in the outer line. It is obvious that for a light cheese the indicator 23 will move a greater distance, and also the turn-table which turns in relation to it, than they would for a cheese of greater weight.

To the lower face of the inner end of the operating arm 19 is fixed a pendent pin 22 which passes through an opening 24 in the inner end of the indicator 23, Fig. 7, which opening is much larger than the pin, whereby should the pawl fail to at once turn the ratchet, which is rigidly fixed on the shaft 15, the pin 22 would not move the indicator. It is important the latter in its computing action should turn only with relation to the shaft 15. To the upper end of one of the standards 17 is fixed a spring 28 whose outer end impinges firmly on the adjacent portion of the rod 15 to prevent the gears from taking up any back loose motion when the operating arm and indicator arm are returned to the starting point.

On one side of the base 1 is rigidly fixed a bracket 30 supporting the knife-guiding bracket 31 as follows: On the lower end of the bracket 31 Figs. 1 and 5, is arranged the integral cross piece 34 pivoted at its ends in said bracket 30 by means of the bolts or set screws 35; whereby the guiding bracket 31 has a limited adjustment with respect to the table if desired. This knife-guide 31 has an integral lateral lug 37 at its base, through which passes the vertical bolt 36 whose lower end is arranged in the lug 36′ of the base 1 Fig. 5, and by means of which the guide 31 is normally secured firmly in its adjusted upright position. This bolt 36 has an adjustable nut 51 arranged thereon between the base lug 37 of the guide 31 and the lug 36′, with which latter the bolt 36 is in a threaded engagement, and has upon its opposite ends the nuts 52 and 53, respectively, by the adjustment of which the guide 31 may be rigidly secured in its upright position in a well understood manner. This upright guide has a vertical slot 32 throughout its length, and has a lateral offset 33 at its upper end.

The cutting knife 38, preferably angular in contour and of proper dimensions, has its upper edge provided with an operating handle 39 whose forward end is provided with the bifurcations 40, each of which has its free end pivotally connected to the upper end of the supporting bracket 41 by means of the bolt 42, and which bracket in turn is pivotally mounted at its lower end on the supporting brackets 30 by means of the bolts 43. The knife 38 has at its outer lower corner a fixed transverse bolt 38′ which is slidably arranged in the guiding slot 32 of the bracket 31, whereby the knife in descent and cutting action is automatically controlled to impart to its lower cutting edge a downward draw-cut when first cutting through the crust of a cheese, after which it automatically changes in its radial movement until the cutting edge assumes a position parallel with that of the upper surface of the turn-table.

To firmly secure and support the last portion of the cheese to be subdivided, I have provided a detachable vertical plate 44 having at one lower corner a lug 44′ adapted to fit the curved perimeter of the turn-table 4, and to be firmly but detachably secured thereto in an upright position, as shown in Fig. 6, by means of the set-screws 49. This plate 44 has a vertical slot 45 therein in which is arranged a thumb-screw 47. On one side of this plate 44 is arranged a horizontal bracket 46 having upon its upper face an internally screw-threaded lug 50 in which the inner end of the thumb-screw 47 is secured, thereby affording to the bracket 46 a vertical adjustment. This bracket 46 also has a plurality of pendent fixed serrated plates 48 adapted to be holdingly inserted into the top of a cheese and thereby rigidly secure the cheese during the operation of cutting.

The operation of my invention thus described is obvious and briefly stated is as follows: When it is desired to place a cheese upon the machine of my invention for retailing in the usual way, the knife is elevated out of the way into the position shown by dotted outline in Fig. 5, where it will securely remain since the bolt 38′ rests in the off-set 33. The turn-table 4, is then elevated by means of the hand-lever 9 whose outer end is temporarily secured in the off-set 11 of the slot 10. The cheese is now placed upon the turn-table 4 and shifted thereon until the cheese has been accurately centered or balanced upon the turn-table, which now rests upon the conical point of the stud 5, after which the turn-table and the lever 9 are returned to their normal position with the washers 7 resting upon the upper edge of the base 1. The knife is now brought into use for the removal of a triangular section of the cheese during which operation it is automatically controlled in its descent and makes a radial draw-cut, being accurately guided by means of the bolt 38′ in the slot 32, until its cutting edge comes into a position parallel with the surface of the turn-table, and then rests squarely thereon. By my construction for mounting and guiding the knife, above described, I secure the draw-cut action of the knife in its highest degree and most efficient action at that point in its descent where it is most needed, namely; at the point where it enters the outer and hard crust of the cheese, thereby obviating the liability of crushing and crumbling a brittle cheese in cutting. When the cutting action is completed the cutting edge of the knife from point to heel rests normal upon the surface of the said turn-table. After the removal of this preliminary cut the plate 44 is placed in its radial position with that face shown in Fig. 6 pressed firmly against one face of the cheese, after which the holding plate 46 is pressed into the top of the cheese and secured in such position by means of the thumb-screw 47. The cheese for convenience is so arranged upon the turn-table that the side of the radial cut adjacent to the scale plate 29 is in alinement with the cutting edge of the knife; and the indicating finger 25 being so adjusted longitudinally upon the arm 23 as to follow in its movements that one of the semicircular concentric lines shown on the said scale-plate which corresponds to the weight of the cheese, the operator moves the arm 23 to the right by means of the operating handle 19 until the finger 25 reaches the mark or dot which indicates the desired quantity either in weight or value, the turn-table, of course, rotating a corresponding distance, and carrying with it the surmounted cheese. The operator now lowers the knife 38 which thus severs the desired quantity by a radial draw cut, the knife being so arranged that the lower corner of the inner end of the knife will make a clean cut to the gravity center of the cheese. In the mean time the cheese body is firmly held by the plate 44 in the manner described. The fractional indicator arm 23 can readily be returned after each operation without moving the turn-table by means of the operating handle 19 which engages the same by means of the pin 22, as described.

When from any cause a cheese has been distorted in contour, as by heat in storage, it can be accurately centered upon the turn-table when elevated and balanced upon the pivotal support, after which each slice from any part of the diameter of the cheese, will be properly measured as before described.

I do not desire to be understood as limiting myself to the specific mechanism described, as many equivalent means may be employed to carry out my generic invention of a cheese cutter having a radially controlled automatic changeable moving blade adapted for a draw-cut in operation when it first enters the cheese, then changing in its radial movement. For example a gear made in an elliptical form could readily be provided which would vary the arc movement of the knife instead of the slotted guiding standard 31.

Having thus described my invention and the manner of employing the same what I desire to secure by Letters Patent is:

1. In a cheese cutter a knife having two cutting edges at right angles and a radially movable fulcrum adapted to afford to the said knife a radial draw-cut, and provided with a fixed upright coöperative guide adapted to control the radial movement of the said fulcrum and of the said knife, in combination with a rotatable turn-table.

2. In a cheese cutter, an upright bracket pivotally fulcrumed at its lower end; a knife pivotally fulcrumed in the upper end of the said bracket, and having the inner and lower cutting edges in right angular relation to each other; and means for guiding the movements of the knife in effecting a radial draw-cut.

3. A cheese cutting blade; a radially movable fulcrum for the said blade; and a fixed vertical guide adapted to so control the said blade in its descent as to secure a radial draw-cut, in combination with a rotatable turn-table; and means for rotating the said turn-table.

4. A cheese supporting turn-table rotatably mounted upon a supporting base; means for rotating the turn-table; and means for throwing said table rotating means out of action by a vertical adjustment of the turn-table.

5. A rotatable cheese supporting turn-table in coöperative relation with the cheese cutting knife; means for actuating the said table when in its normal position; means for throwing said table actuating means out of action by a vertical adjustment of the table for the purpose of centering the surmounted cheese by gravity; a radially movable fulcrum for the said knife; a knife pivoted on said fulcrum and having a draw-cut; and a guide for the said knife adapted to control the movement of the said fulcrum.

6. In a cheese cutting apparatus, a rotatable and vertically adjustable table normally at its lowest limit; means for rotatably actuating the table when in its normal position; means for elevating the said table temporarily for the purpose of centering the said surmounted cheese by gravity; a horizontal graduated scale-plate arranged above the cheese; indicating mechanism in coöperation therewith; and means for operatively connecting the indicating mechanism with the turn-table actuating means.

7. In a cheese cutter a rotatable cheese supporting table adapted for a limited vertical adjustment to throw it out of gear with its actuating means, for the purpose of centering the surmounted cheese by gravity; a knife pivoted upon a radially movable fulcrum means for rotatably actuating the table; a fixed upright guide for the said knife; and a holding plate detachably mounted on the said table in vertical relation, and provided with means for firmly engaging the cheese body as described.

8. In a cheese cutting apparatus, a cheese supporting table rotatably mounted upon a fixed support; means for actuating the said table; means for balancing the said table at its center upon a pivotal support free from the actuating means for the purpose of centering the surmounted cheese; a graduated scale plate; indicating mechanism in coöperative relation with the scale-plate; means for imparting to the table actuating means and the indicating mechanism a simultaneous and coöperative movement; and a radially movable knife plate adapted to sever the cheese body by a draw-cut.

9. In a cheese cutting apparatus, a cheese carrying turn-table rotatably mounted upon a supporting base normally in gear with the actuating means; actuating means for the said turn-table; and means for throwing the turn-table out of gear by a vertical adjustment thereof for the purpose of balancing the cheese thereon to make its gravity center coincide with the axial center of the turn-table.

10. In a cheese cutting apparatus, a cheese carrying turn-table rotatably mounted upon a supporting base, and normally in gear with its actuating means, and adapted to be thrown out of action by a vertical adjustment when it is desired to so center the cheese thereon as to make its gravity center coincide with the axial center of the turn-table; and actuating means for the said turn-table.

11. In a cheese cutter, a knife adapted to be operated to and from a horizontally rotatable turn-table; a rotatable turn-table in coöperative relation with the said knife; a radially movable fulcrum for the said knife; and a coöperative guide adapted to control a radial movement of the said fulcrum and of the said knife.

12. In a cheese cutter, a supporting base; a horizontally rotatable table mounted upon said base; a radially guided cutting knife; a radially movable fulcrum for the said knife; and means for controlling the movements of said knife and said fulcrum, for the purpose described.

13. A cheese cutter having a radially movable fulcrum and knife, in coöperative relation with the horizontally rotating turn-table, and means for controlling the movement of said fulcrum and knife for the purpose of imparting to said knife a draw-cut.

14. In a cheese cutter a knife operating to and from a turn-table; a turn-table rotatably mounted upon a base in combination with a measuring device comprising an index arm having a frictional turning engagement on a shaft; an upright rotatable shaft in gear with the said turn-table, and carrying the said arm; a plurality of scales to indicate any desired size or value of segment of the cheese; and an indicating finger slidably mounted upon said arm in coöperative relation with the said scales to indicate the size of the desired segment to be cut from the surmounted cheese.

15. In a cheese cutting apparatus, a pivotally mounted cheese carrying-turn-table; means for rotating the turn-table; means for so balancing the turn-table that a cheese can be centered thereon by gravity, whereby the gravity center of the cheese will coincide with the axial center of the turn-table.

16. A cheese cutting apparatus comprising a supporting base; a cheese carrying turn-table pivotally mounted on the base; means for rotating the turn-table; means for so balancing the turn-table that a cheese can be centered thereon by gravity, whereby the gravity center of the cheese will coincide with the axial center of the turn-table.

17. In a cheese cutting apparatus means for centering the cheese, consisting of a cheese carrying turn-table rotatably mounted upon a supporting base; means for actuating the turn-table; and means for pivotally supporting the turn-table to permit the centering of the cheese, thereon by gravity to make its gravity center coincide with the axial center of the turn-table.

18. In a cheese cutting apparatus means for centering the cheese consisting of a cheese carrying turn-table rotatably mounted upon a supporting base; means for actuating the turn-table; and means for disengaging the turn-table from its actuating means and pivotally supporting it at its center to permit the centering of the surmounted cheese by gravity for the purpose specified.

Signed by me at Fort Wayne, Allen county, State of Indiana, this 25th day of October, 1904.

WILLIAM F. KESSLER.

Witnesses:
WATTS P. DENNY,
WALTER G. BURNS.